June 2, 1970
H. BEHRENS
3,515,885
APPARATUS FOR MEASURING SWEEP OF CONTINUOUS STRIP MATERIAL
Filed Oct. 14, 1966
2 Sheets-Sheet 1

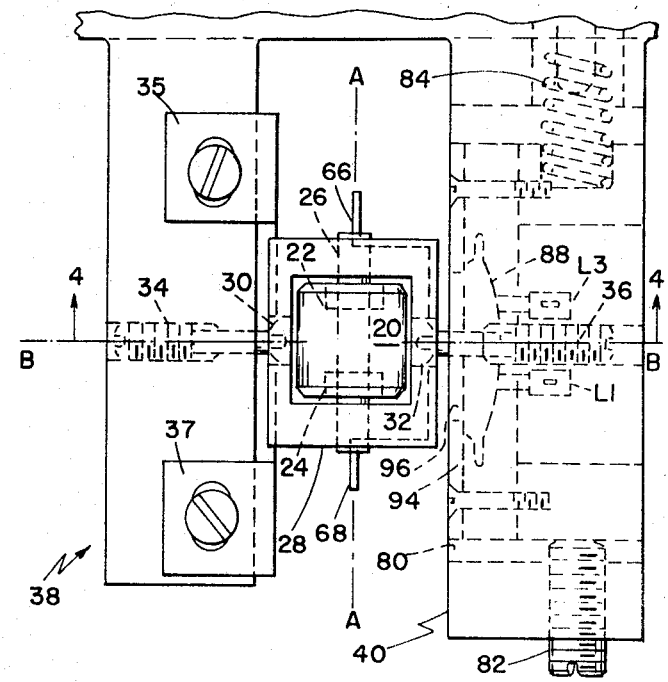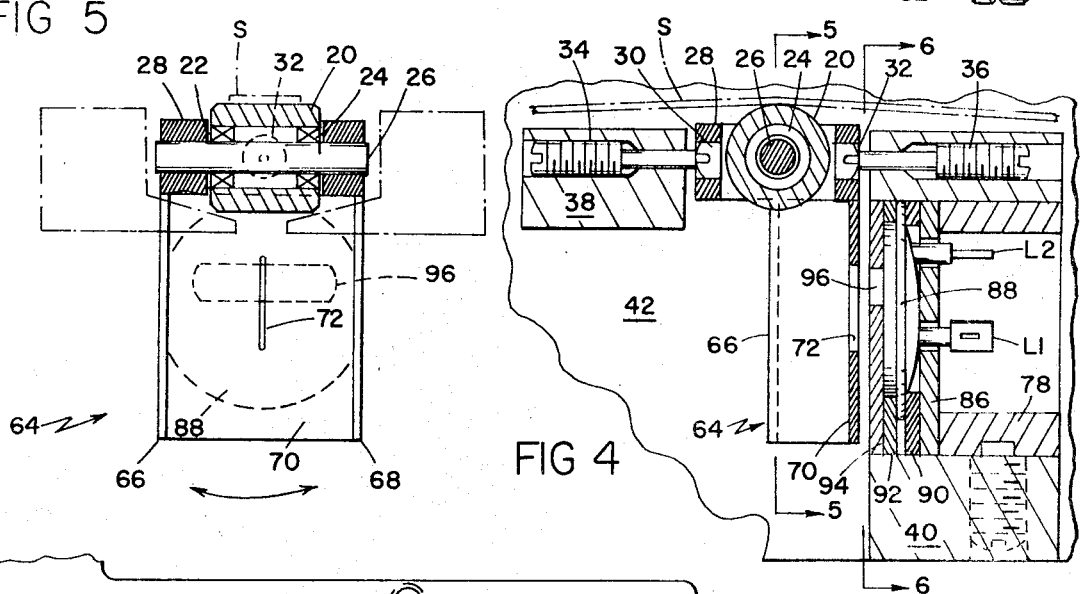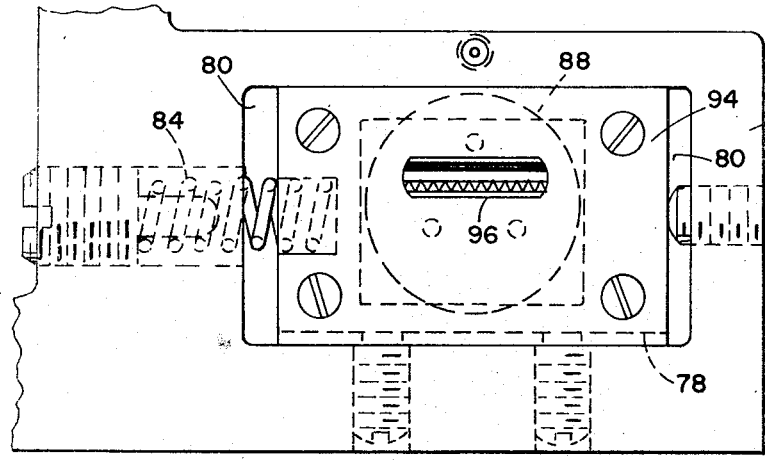

United States Patent Office 3,515,885
Patented June 2, 1970

3,515,885
APPARATUS FOR MEASURING SWEEP OF
CONTINUOUS STRIP MATERIAL
Henry Behrens, Topsfield, Mass., assignor to The Gillette
Company, Boston, Mass., a corporation of Delaware
Filed Oct. 14, 1966, Ser. No. 586,852
Int. Cl. G01n 21/18, 21/30
U.S. Cl. 250—219     3 Claims

ABSTRACT OF THE DISCLOSURE

Apparatus for measuring the curvature in its own plane (sweep) of continuous strip material includes two spaced strip guides that define a predetermined path. Each strip guide has a pair of spaced walls for limiting the lateral movement of the strip material along the strip path. A frame structure is mounted between the two strip guides for pivotal movement about an axis parallel to the path and supports a roller which is mounted for rotation about an axis perpendicular to the pivot axis of the frame structure and contacts the lower surface of the strip at a point above the support surface of either strip guide. A photopotentiometer is mounted on one side of the frame structure and a light source is disposed on the opposite side. The frame structure includes a depending baffle that includes a narrow light transmitting window. The strip to be measured is passed under tension between the strip guides and over the roller. Sweep in the strip causes the roller to tilt about the pivot axis of the frame structure, moving the baffle to change the position of impingement of light on the photopotentiometer, thus providing a measurement of sweep in the strip.

---

This invention relates to the measurement of curvature in its own plane of continuous strip (e.g. ribbon razor blade) material.

Objects of the invention are to provide for such measurement with great accuracy and repeatability, as required in the manufacture of precision thin ribbon razor blades, while using apparatus that is relatively simple, reliable and low in cost of manufacture. In the processing of metal strip for the manufacture of razor blades and particularly the manufacture of a ribbon type blade of stainless steel, the physical dimensions of the strip steel are critical, particularly in connection with the forming of a sharp shaving edge on one side of the strip as by a grinding and honing sequence. The strip, for quality processing with high volume production techniques, must be without significant curvature along its length ("sweep"). It is another object of this invention to provide apparatus for detecting and/or measuring small amounts of sweep in strip material of indeterminate length. Another object of the invention is to provide apparatus for measuring sweep condition in strip material and particularly ribbon razor blade stock in a continuous process system.

In general the invention features apparatus responsive to a length differential between the longitudinal edges of continuous strip material. The strip material under tension is passed over a strip contact surface mounted for movement (preferably pivotal movement about an axis parallel to the direction of passage of the strip). A detector is arranged to detect movement of the contact surface resulting from the tension-induced displacement of the shorter strip edge against the surface in the event the strip has an edge length differential. In preferred embodiments the contact surface is the surface of a roller mounted for rotation about a second axis (preferably perpendicular to the first mentioned axis); and the detector is a photoelectric arrangement in which preferably a narrow apertured baffle is mechanically coupled to the contact surface for response to its movement and a light source is arranged to shine through the baffle aperture on to a photopotentiometer.

Figure 1:
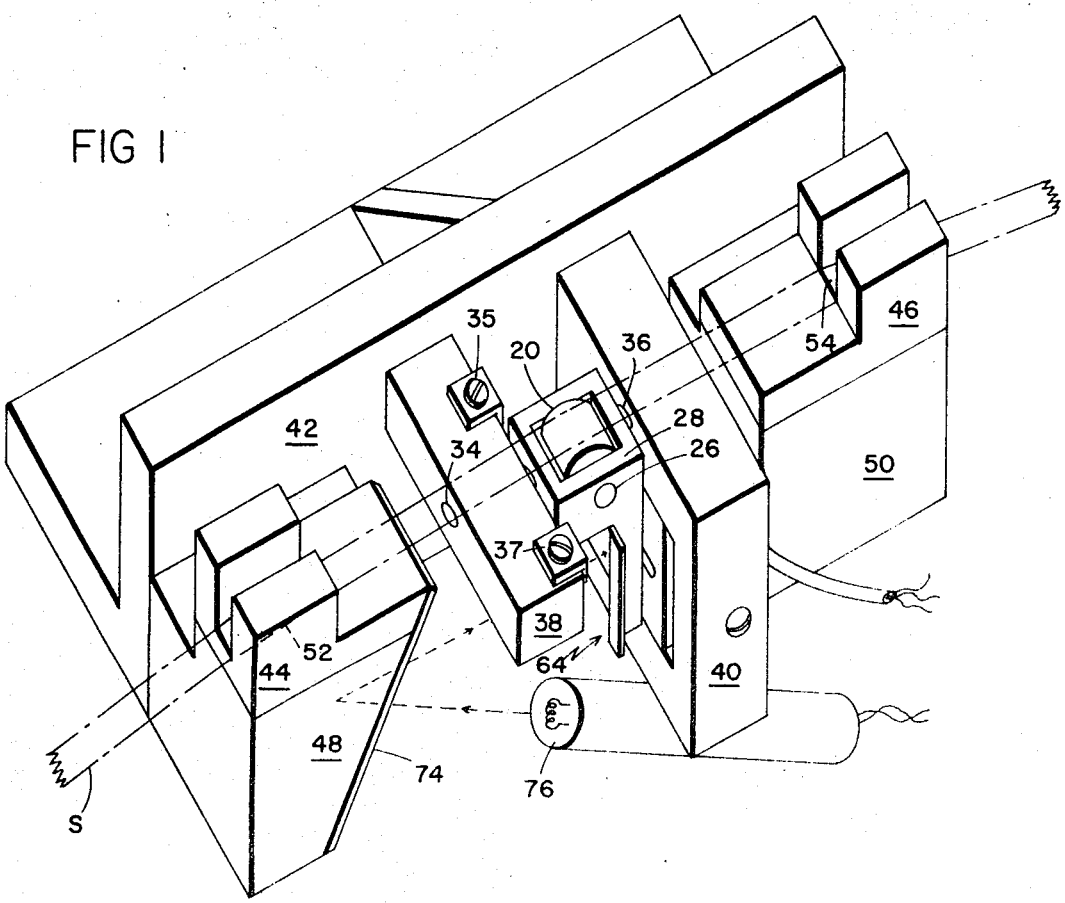
Figure 2:
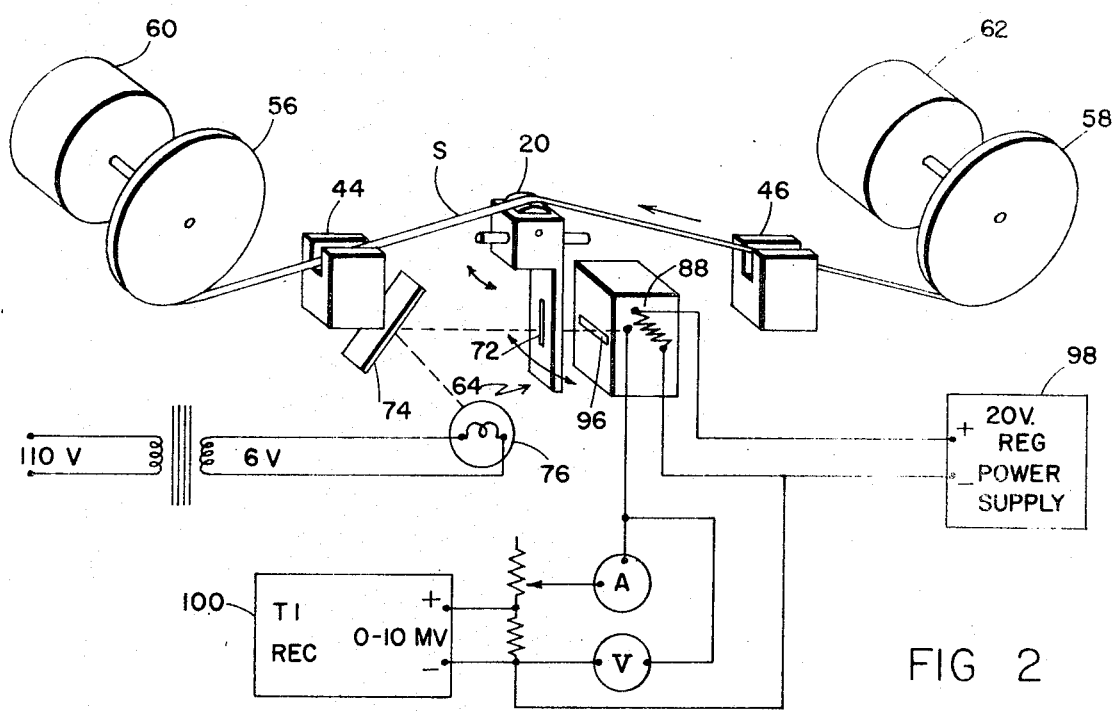

Other objects, features, and advantages will appear from the following description of a preferred embodiment of the invention, taken together with the attached drawings thereof, in which:

FIG. 1 is a perspective view of apparatus of the invention;
FIG. 2 is a diagrammatic view of apparatus of the invention;
FIG. 3 is a plan view partially in section of the apparatus shown in FIG. 1;
FIG. 4 is a section through 4—4 of FIG. 1;
FIG. 5 is a section through 5—5 of FIG. 4; and
FIG. 6 is a section through 6—6 of FIG. 4.

As indicated in FIGS. 3–5, carbide roller 20 has precision bearings 22, 24 press fitted into its ends and is mounted for rotation about axis A—A on pin 26 supported in frame 28. Frame 28 in turn carries jeweled bearings 30, 32 and is mounted for rotation about axis B—B, perpendicular to axis A—A, between pins 34, 36 carried by support arms 38, 40 of base 42. Stops 35, 37 adjustably mounted on arm 38, limit the rotation of frame 28.

With reference to FIGS. 1 and 2, strip guides 44, 46 (4" apart) are mounted on arms 48, 50 of base 42, and are aligned respectively in front of and behind roller 20, with their lower strip supporting surfaces 52, 54, .077" below the top surface of roller 20. A strip transport system is diagrammatically indicated as tension rolls 56, 58, respectively coupled to take-up motor 60 and tension brake 62, and located 48" apart at their center lines respectively in front of and behind strip guides 44, 46.

Baffle 64 hangs from frame 28 and includes vertical side walls 66, 68 (FIG. 5) and vertical rear wall 70 in which is cut a vertical slit (0.01" x 5/16") 72.

Plated metal mirror 74 (FIG. 1) is mounted on arm 48 opposite baffle 64 to reflect light from light source 76 through slit 72.

With reference to FIG. 6, adjustment block 78 is mounted in recess 80 in arm 40, between screw 82 and compression spring 84, and carries mounting plate 86 (FIG. 4) through which extends the terminals $L_1$, $L_2$, $L_3$ of light actuated photopotentiometer 88 (Giannini Controls Corp. Model 8644, Type A). The body 89 of photopotentiometer 88 is secured between gaskets 90, 92 (FIG. 4). Front plate 94 having horizontal slot 96 (½" x ⅛") is mounted in front of body 89 and acts as a mask over all except the active area of the photopotentiometer.

Photopotentiometer 88 (FIG. 2) is connected to power supply 98 and its output signal is fed to microammeter A and recording device 100.

In operation, strip S (FIGS. 1 and 2) is guided between rolls 56, 58 under uniform tension (100 grams) in contact with the upper surface of roller 20. Strip guides 44, 46 align the strip over roller 20. If one edge of strip S is shorter than the other, over the span between rolls 56, 58 frame 28 and baffle 64 will rotate on bearings 30, 32 (FIG. 3) changing the position of slit 72 (FIG. 5) and hence the position of the narrow light beam impinging on photopotentiometer 88. This change in position of the light beam produces a corresponding change in the photopotentiometer output signal which is indicated by meter A (FIG. 2) and recorded by device 100, and appropriate corrective action may be taken. The lateral position of photopotentiometer 88 may be adjusted by turning screw 82 against the tension of spring 84 for initial centering.

With the foregoing apparatus accurate curvature measurements are made on stainless steel razor blade strip material 0.0015" thick by 0.193" wide, in a quality control process having a curvature limit of 3/32" edge length differential per 24" of strip, beyond which strip material is rejected, and a curvature limit of 2/32" per 24", beyond which the strip hardening process is adjusted.

Other embodiments will occur to those skilled in the art and are within the following claims.

What is claimed is:

1. Apparatus for measuring the curvature in its own plane of continuous strip material comprising two spaced strip guides defining a predetermined strip path, each said strip guide having a pair of spaced walls for limiting lateral movement of said strip material, frame structure mounted between said strip guides for pivotal movement about an axis parallel to said path, a roller mounted on said frame structure for rotation about an axis transverse to said path, said frame structure supporting said roller so that said roller contacts said strip material at a point above the support surfaces of said two strip guides, a strip feed for passing said strip material under tension along said predetermined path, and a detector for detecting tilting movement of said frame structure to provide an indication of the curvature in its own plane of said strip material.

2. The apparatus as claimed in claim 1 wherein said detector includes a baffle mechanically coupled to said frame structure for pivotal movement therewith and having a narrow light transmitting portion, a light source arranged to generate a beam of light for impingement on said baffle, and a light sensor located on the opposite side of said baffle from the side on which said light beam impinges for producing an output signal as a function of the position of said light transmitting portion relative to said light source.

3. The apparatus as claimed in claim 1 wherein said strip material is razor blade steel, said roller is manufactured of carbide, and said detector includes a baffle structure depending from said frame structure below said roller for pivotal movement with said frame structure and having a narrow light transmitting slit, a light source arranged to generate a beam of light for impingement on said baffle, and a photopotentiometer located on the opposite side of said baffle from the side on which said light beam impinges and responsive to light passing through said slit, said photopotentiometer providing an output indicative of curvature of said razor blade steel strip in excess of 1/32 inch per foot.

References Cited

UNITED STATES PATENTS

| | | | |
|---|---|---|---|
| 2,075,111 | 3/1937 | Gulliksen et al. | 250—219 X |
| 2,116,593 | 5/1938 | Bouvier et al. | 250—231 X |
| 2,318,993 | 5/1943 | Hathaway | 250—231 X |
| 2,344,817 | 3/1944 | Hlavaty | 250—231 X |
| 2,558,761 | 7/1951 | Kentis | 250—231 X |
| 2,931,917 | 4/1960 | Beelitz | 250—219 X |
| 3,032,691 | 5/1962 | Cubellis | 250—219 X |
| 3,090,534 | 5/1963 | Frommer et al. | 250—219 X |

RALPH G. NILSON, Primary Examiner

M. ABRAMSON, Assistant Examiner

U.S. Cl. X.R.

250—231